Figure 1:
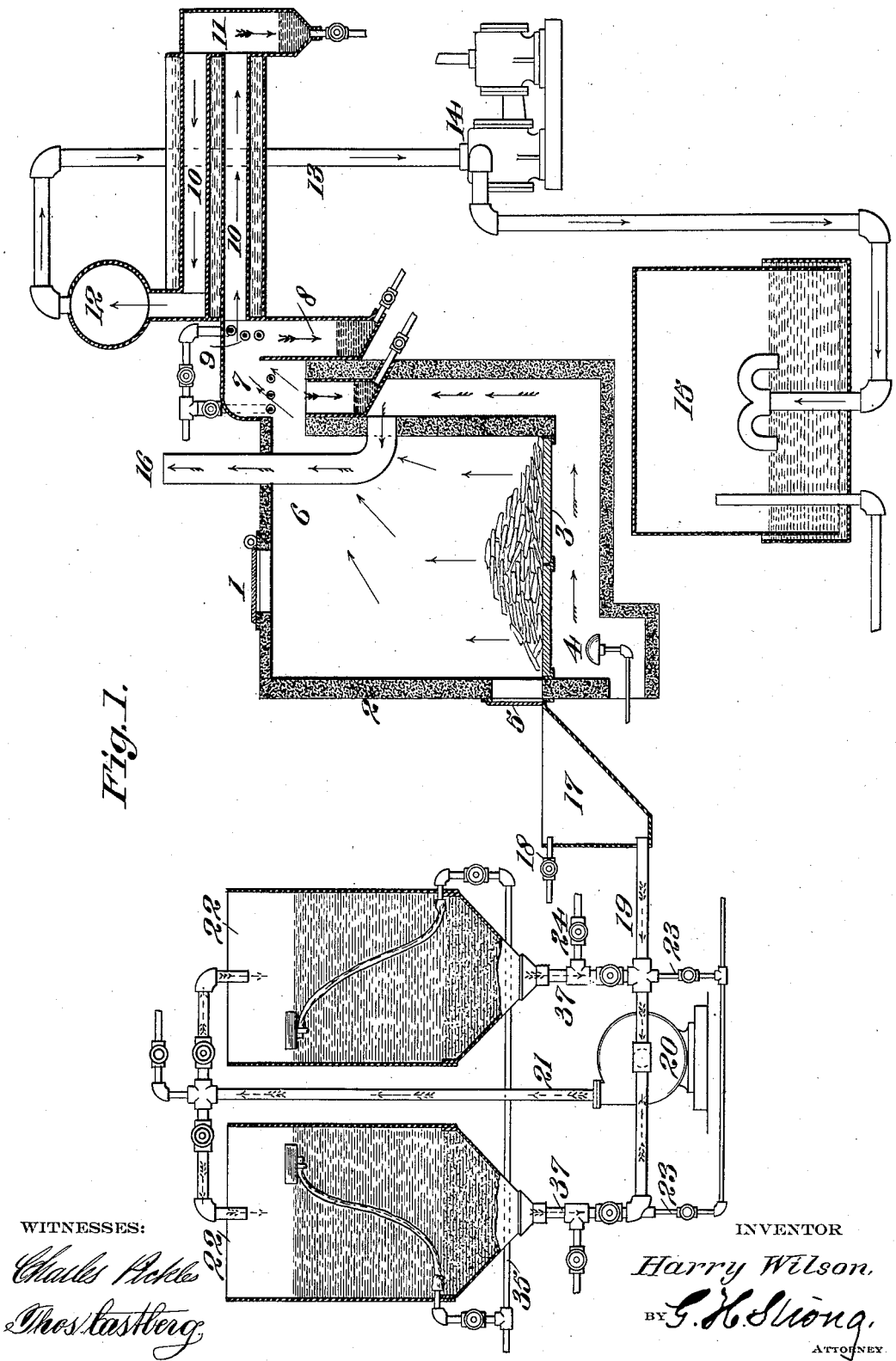

H. WILSON.
KELP REDUCTION.
APPLICATION FILED DEC. 26, 1912.

1,116,965.

Patented Nov. 10, 1914.
2 SHEETS—SHEET 1.

WITNESSES:
Charles Pickles
Thos. Castberg

INVENTOR
Harry Wilson.
BY G. H. Strong.
ATTORNEY

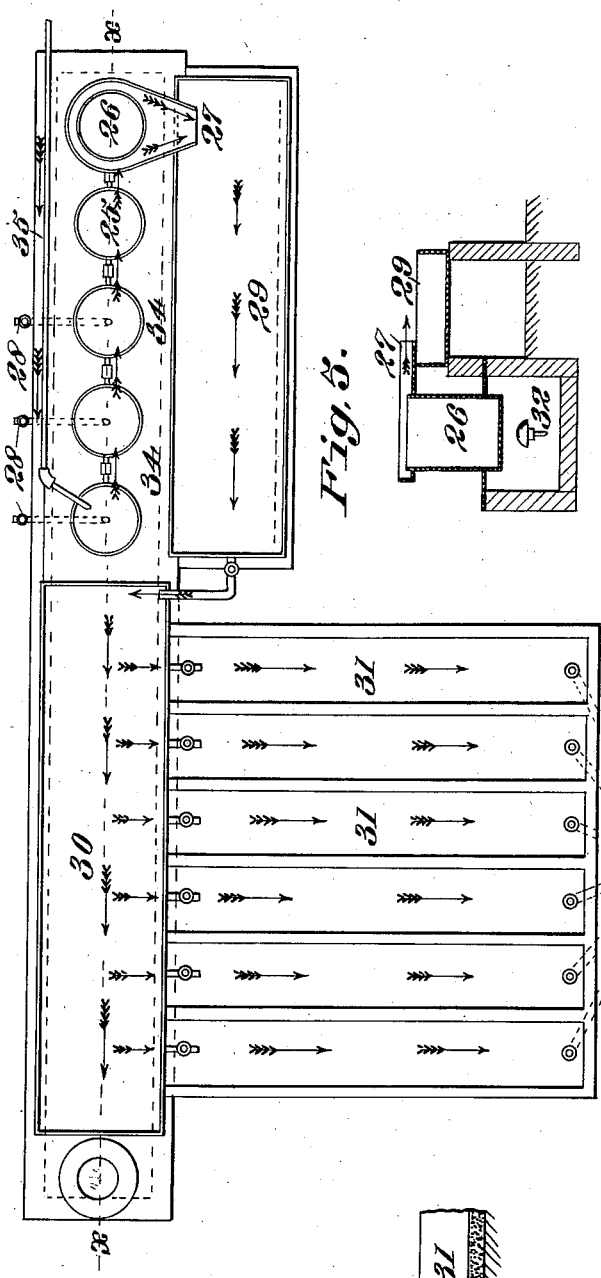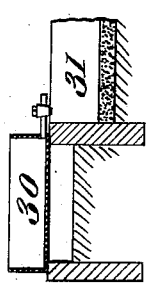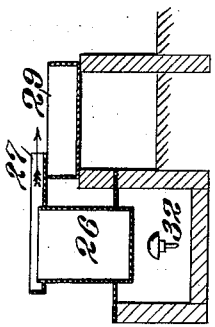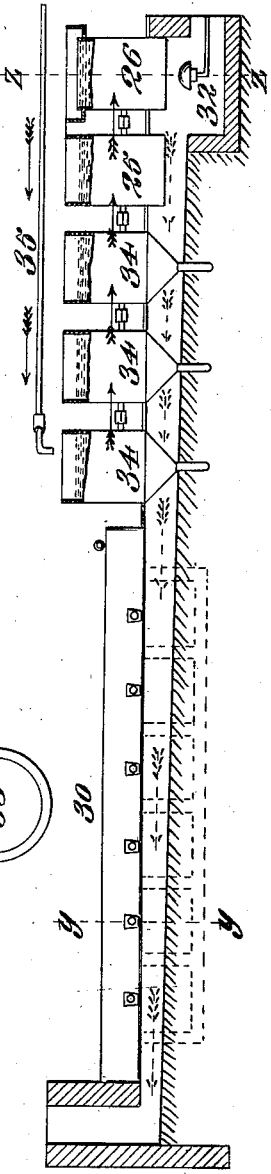

UNITED STATES PATENT OFFICE.

HARRY WILSON, OF SAN FRANCISCO, CALIFORNIA, ASSIGNOR TO PACIFIC KELP COMPANY, OF SAN FRANCISCO, CALIFORNIA, A CORPORATION OF CALIFORNIA.

KELP REDUCTION.

1,116,965.  Specification of Letters Patent.  Patented Nov. 10, 1914.

Application filed December 26, 1912. Serial No. 738,655.

*To all whom it may concern:*

Be it known that I, HARRY WILSON, a citizen of the United States, residing in the city and county of San Francisco and State of California, have invented new and useful Improvements in Kelp Reduction, of which the following is a specification.

The present invention relates to a mechanical device and process for the extraction of potassium, sodium, magnesium and calcium salts with their combining sulfates, chlorids, carbonates and iodids from all manner of sea-weed or kelp, together with a complete recovery of organic carbon, creosote, acetic acid, acetone, alcohol and combustible gas from the volatile content thereof.

The material to be recovered is divided into three distinct classes, namely: soluble, insoluble and volatile. The soluble contains the sulfates, chlorids and iodids of potassium, sodium and magnesium, and the sulfates of magnesium and calcium. The insoluble contains the carbonates of calcium and magnesium. The volatile contains organic carbon or paint pigment, or varnish gum, vegetable creosote, acetic acid, acetone, alcohol and combustible gas.

The separation of the different salts in the soluble matter and the different contents of the volatile matter may be accomplished by means of suitable apparatus represented in the accompanying drawings, in which—

Figure 1 is a section through the kiln and lixiviating tanks. Fig. 2 is a detail plan view of the evaporating and cooling tanks. Fig. 3 is a vertical longitudinal section on the line X—X of Fig. 2. Fig. 4 is a vertical cross section on the line Y—Y of Fig. 3. Fig. 5 is a vertical cross section on the line Z—Z of Fig. 3.

Having reference to the accompanying drawings:

1.—Opening through which dried kelp is entered.
2.—Kiln in which combustion takes place.
3.—Permanent cast iron bottom through which heat enters.
4.—Oil burner to supply heat.
5.—Opening through which residual matter is discharged.
6.—Chamber in which volatile matter is first discharged, super-heated at the bottom and with temperature regulated at the top by cold water passing through pipes.
7.—Cold water pipes to regulate temperature at discharge point of chamber 6.
8.—Chamber for the second deposit of volatile matter with temperature regulated by cold water pipes 9.
9.—Cold water pipes to regulate temperature at the discharge point of chamber 8.
10.—Metal pipes passing through a tank of cold water draining toward chamber 11.
11.—Chamber to receive the third deposit of volatile matter.
12.—Chamber to receive combustible gases.
13.—Connection between gas chamber 12 and compression pump 14.
14.—Gas compression pump.
15.—Gas storage tank into which the gas is passed through a water bath which completely purifies it.
16.—Passage for overflow heat and smoke from oil burner 4, heating the bottom of chamber 6 by circulation around it.
17.—Sump for the mixture of ash and water.
18.—Pipe through which clear water is introduced.
19.—Pipe connecting sump with centrifugal pump.
20.—Centrifugal pump for elevating semi-solution and circulating solution while salts dissolve.
21.—Pipe connecting centrifugal pump with top of tank to complete circulating system.
22.—Lixiviating tank with 45° conical bottom.
23.—Pipe through which steam is introduced to bottom of conical tank.
24.—Discharge pipe for all insoluble matter.
35.—Pipe through which clear, saturated solution enters evaporating system.
34.—First heated tanks of evaporating system in which sulfates of lime and magnesium settle out and are discharged from the bottom.
25.—Second heated tanks of evaporating system in which heat and gravity are increased.

26.—Third heated tank of evaporating system where heat and gravity are increased until sulfates of potassium, sodium and magnesium crystallize out but remain in suspension through the motion of the water as this tank is kept at a boiling point.

27.—Overflow for boiling liquor to pass into tank 29, carrying the crystallized salts over with the liquor.

29.—Fourth period of evaporating system where the boiling liquor is allowed to cool to a temperature of 60° C. at which point all of the sulfates have crystallized out and the chlorids and iodids remain in solution, passing to tank 30.

30.—Fifth period of evaporating system receiving liquor from tank 29 wherein the temperature is increased to 100° C. and evaporation continues until all of the sodium chlorid has crystallized out. The potassium chlorid through its increased solubility at this temperature remains in solution, passing to concrete cooling tanks 31.

31.—Concrete cooling tanks where the solution from tank 30 is allowed to cool until all of the potassium chlorid has crystallized out, the mother liquor then being dried out and retorted to recover the iodin.

32.—Oil burner supplying heat for evaporating system.

33.—Sump to receive mother liquor from cooling tanks 31.

36.—Smoke discharge from oil burner 32.

37.—Pipe connecting bottom of conical tank with centrifugal pump.

28.—Valves for discharge of sulfates from heated evaporating tanks 34.

The sea-weed or kelp is dried by any process to that condition where it still retains 15% to 20% of its original moisture, this amount being necessary to retain within the product that portion of the iodin, creosote and oils termed organic. This dried seaweed or kelp is placed in the closed kiln 2, constructed of pressed molded bricks of porous clay, laid in and lined with the same material, having a permanent cast iron bottom 3, through which the heat is introduced to the chamber and the movable iron top 1, through which the dried material is entered, and with an open passage for the volatile content to pass out.

The porous clay sides will allow the air to enter the chamber only fast enough to supply the vacuum created by the gas compression pump, but not concentrated at any given point or admitted fast enough to cause the material to fuse or decompose the sulfates and iodids.

The heat is introduced through the cast iron bottom and maintained at an even temperature not to exceed 400° C. until combustion has practically ceased on the inside. This completes the separation of the volatile matter.

The volatile matter collecting in heated chamber 6 is re-distilled, all of the oils, gums and liquids passing over into chamber 8, the organic carbon or paint pigment alone remaining. The temperature at the discharge point is held above 120° C.

All of the gums and oils are deposited in chamber 8, the temperature of which is held about 70° C. allowing the creosote, acetic acid, acetone and alcohol to remain in suspension. The acetic acid, creosote, acetone and alcohol are then condensed in passing through the cold water tank and drained and deposited in chamber 11 from which they are taken re-distilled and separated. The combustible gas, which is then free of all solids, is passed through a water bath to take out any excess of non-combustible gases which may have been carried over therewith and deposited in storage for factory uses. The residual matter is then discharged into the receiving sump 17, and there mixed with enough clear water to form a semi-solution; the cold water completely shattering any fused parts there may be. This semi-solution is pumped to the lixiviating tank 22, where sufficient clear water is added to fill that tank with a saturated solution of the soluble salts. Superheated steam is then introduced through the pipe 23, entering the conical bottom of this tank, the pump connection then changed to connect with the conical bottom and operated until the solution therein reaches a temperature of 100° C.; the connection of the centrifugal pump being changed from the sump to the bottom of the conical tank which places all of the material in that tank in constant circulation. During that circulation all of the material passes the jet of super-heated steam which completely dissolves all of the soluble material. The carbonates and a portion of the sulfates will now settle out, which completes the separation between the soluble and insoluble matter. The clear solution is then drained from the top by a flexible pipe supported with a float and passed to the evaporating system through pipe 35. The remaining solids are then washed with clear water, circulated and heated in the same manner and allowed to settle. The clear water drained off is then used to form the next semi-solution in the sump, and so repeated. The solid material is then discharged through pipe 24, dried out, pulverized and used as a basis or filler for fertilizers.

Having thus described my invention, what I claim and desire to secure by Letters Patent, is—

1. An apparatus for reducing kelp consisting of a porous kiln and a condensing apparatus in conjunction therewith, comprising means for separating and separately recovering the products of distillation as they come from the kiln.

2. An apparatus for treating kelp, comprising a porous kiln having a heating compartment at the bottom and one side, and a series of condensing chambers for separately recovering the products of distillation as they come from the kiln.

In testimony whereof I have hereunto set my hand in the presence of two subscribing witnesses.

HARRY WILSON.

Witnesses:
　JOHN H. HERRING,
　IRVINE SINNETT.